US012753011B2

(12) United States Patent
Yamazaki et al.

(10) Patent No.: US 12,753,011 B2
(45) Date of Patent: Oct. 6, 2026

(54) AQUEOUS ADHESIVE COMPOSITION, CLOTH-TRANSPORTING BELT, INK JET TEXTILE PRINTING APPARATUS, AND METHODS FOR PREPARING AQUEOUS ADHESIVE COMPOSITION

(71) Applicant: SEIKO EPSON CORPORATION, Tokyo (JP)

(72) Inventors: Soichi Yamazaki, Shiojiri (JP); Nikako Tsukiji, Matsumoto (JP); Harunobu Komatsu, Matsumoto (JP)

(73) Assignee: SEIKO EPSON CORPORATION (JP)

(*) Notice: Subject to any disclaimer, the term of this patent is extended or adjusted under 35 U.S.C. 154(b) by 118 days.

(21) Appl. No.: 18/812,223

(22) Filed: Aug. 22, 2024

(65) Prior Publication Data

US 2025/0066131 A1 Feb. 27, 2025

(30) Foreign Application Priority Data

Aug. 23, 2023 (JP) ................................ 2023-135306

(51) Int. Cl.

| | |
|---|---|
| ***B65G 15/58*** | (2006.01) |
| ***B41J 3/407*** | (2006.01) |
| ***B41J 15/04*** | (2006.01) |
| ***B65G 15/32*** | (2006.01) |
| ***C09J 9/00*** | (2006.01) |
| ***C09J 133/00*** | (2006.01) |

(52) U.S. Cl.

CPC ............ *B65G 15/58* (2013.01); *B41J 3/4078* (2013.01); *B41J 15/048* (2013.01); *B65G 15/32* (2013.01); *C09J 9/00* (2013.01); *C09J 133/00* (2013.01)

(58) Field of Classification Search

CPC ........ B65G 15/58; B65G 15/32; B41J 3/4078; B41J 15/048; C09J 9/00; C09J 133/00

See application file for complete search history.

(56) References Cited

U.S. PATENT DOCUMENTS

| | | | | |
|---|---|---|---|---|
| 2002/0122997 | A1* | 9/2002 | Lee .......................... | G03G 5/10 524/495 |
| 2009/0074492 | A1* | 3/2009 | Ito .......................... | G03G 15/00 399/388 |
| 2011/0142463 | A1* | 6/2011 | Takazawa ............ | G03G 15/162 399/312 |
| 2012/0274002 | A1* | 11/2012 | Uchida ................... | B29C 49/12 264/447 |
| 2013/0231207 | A1* | 9/2013 | Iwano ...................... | C08L 23/28 428/394 |
| 2013/0242015 | A1* | 9/2013 | Ageishi ................ | G03G 15/162 156/137 |
| 2017/0058065 | A1* | 3/2017 | Aida ...................... | C08F 214/26 |
| 2020/0387098 | A1* | 12/2020 | Abe .................... | G03G 15/2057 |
| 2021/0003943 | A1* | 1/2021 | Egawa ................. | G03G 15/161 |

(Continued)

FOREIGN PATENT DOCUMENTS

JP 2020-109036 A 7/2020

*Primary Examiner* — David H Banh

(74) *Attorney, Agent, or Firm* — Harness, Dickey & Pierce, P.L.C.

(57) ABSTRACT

An aqueous adhesive composition forms an adhesive layer on a cloth-transporting belt of an ink jet textile printing apparatus. The aqueous adhesive composition contains acrylic resin and forms an adhesive layer with an adhesion of 0.1 N/25 mm to 10 N/25 mm.

12 Claims, 2 Drawing Sheets

(56) References Cited

U.S. PATENT DOCUMENTS

| | | | | |
|---|---|---|---|---|
| 2021/0302901 | A1* | 9/2021 | Ishio | G03G 9/08773 |
| 2021/0333724 | A1* | 10/2021 | Kojima | C08K 5/20 |
| 2022/0082965 | A1* | 3/2022 | An | G03G 15/1615 |
| 2022/0282769 | A1* | 9/2022 | Kobayashi | C08K 7/02 |
| 2025/0066131 | A1* | 2/2025 | Yamazaki | C09J 133/00 |
| 2025/0066647 | A1* | 2/2025 | Komatsu | C08F 220/1811 |
| 2025/0263589 | A1* | 8/2025 | Yamazaki | B41J 29/17 |

* cited by examiner

FIG. 2

| | | | | Example | | | | | | | | Comparative Example | | Example | Comparative Example | | Example | | | |
|---|---|---|---|---|---|---|---|---|---|---|---|---|---|---|---|---|---|---|---|---|
| | | | | 1 | 2 | 3 | 4 | 5 | 6 | 7 | 8 | 1 | 2 | 9 | 3 | 4 | 10 | 11 | 12 | 13 |
| Material at blet surface | | | | Urethane | Urethane | Urethane | Urethane | Urethane | Urethane | Polyester | Polyester | Urethane | Urethane | Urethane | Urethane | Urethane | Urethane | Urethane | Urethane | Urethane |
| Makeup of Adhesive | Highly sticky aqueous acrylic emulsion | A-1 (BPW 6441) | [Parts by mass] | 60 | 40 | 40 | 20 | 60 | 40 | 60 | 40 | 100 | 80 | 70 | 10 | - | 60 | 40 | 60 | 40 |
| | High-strength aqueous acrylic emulsion | A-2 (BPW 6441 + CARBODILITE E-02) | [Parts by mass] | - | - | - | - | - | - | - | - | - | - | - | - | - | 40 | 60 | - | - |
| | | A-3 (BPW 6441 + CARBODILITE E-02 + ammonia) | [Parts by mass] | 40 | 60 | 60 | 80 | 40 | 60 | 40 | 60 | - | 20 | 30 | 90 | 100 | - | - | - | - |
| | | A-4 (BPW 6441 + CARBODILITE E-02 + NaOH) | [Parts by mass] | - | - | - | - | - | - | - | - | - | - | - | - | - | - | - | 40 | 60 |
| | pH adjuster | Ammonia water (ammonia 28 mass%) | [Parts by mass] | 0.5 | 0.5 | - | 0.5 | - | - | 0.5 | 0.5 | 0.5 | 0.5 | 0.5 | 0.5 | 0.5 | - | - | - | - |
| | Surfactant | Ammonium lauryl sulfate | [Parts by mass] | - | - | 1.0 | - | - | - | - | - | - | - | - | - | - | - | - | - | - |
| Adhesive | Ion meter measurement | Ammonium ion concentration | [ppm] | 5120 | 6230 | 6506 | 7894 | 1958 | 2673 | 5129 | 5896 | 2652 | 4926 | 5182 | 6097 | 6892 | 857 | 794 | 796 | 802 |
| | | Sodium + potassium ion concentration | [ppm] | 26 | 32 | 29 | 29 | 22 | 31 | 35 | 28 | 34 | 31 | 32 | 35 | 27 | 28 | 31 | 1730 | 2003 |
| Dried adhesive coating | Pencil hardness | (6B-6H) | | HB | 2H | 2H | 4H | HB | 2H | HB | 2H | 6B | 4B | B | 4H | 6H | HB | 2H | HB | 2H |
| | Mohs hardness | (1-10) | | 2 | 2 | 2 | 2 | 2 | 2 | 2 | 2 | 1 | 1 | 1 | 2 | 2 | 2 | 2 | 2 | 2 |
| | Stickiness | [N/25 mm] | | 9 | 4 | 4 | 0.1 | 9 | 4 | 9 | 4 | 21 | 11 | 9 | 0.02 | 0 | 9 | 5 | 9 | 4 |
| | Water resistance | (Degree of whiteness 20 min after 23°C pure water immersion) | | A | A | A | A | A | A | A | A | A | A | A | A | A | B | B | C | C |
| Transportability | | 10 m transportability for cloth | | A | A | A | A | A | A | C | C | E | E | A | D | D | B | A | A | A |
| | | 1000 m transportability for cloth | | A | A | A | B | A | A | C | C | E | E | B | D | D | D | D | D | D |
| | | 10000 m transportability for cloth | | A | A | A | B | A | A | C | C | E | E | D | D | D | D | D | D | D |

AQUEOUS ADHESIVE COMPOSITION, CLOTH-TRANSPORTING BELT, INK JET TEXTILE PRINTING APPARATUS, AND METHODS FOR PREPARING AQUEOUS ADHESIVE COMPOSITION

The present application is based on, and claims priority from JP Application Serial Number 2023-135306, filed Aug. 23, 2023, the disclosure of which is hereby incorporated by reference herein in its entirety.

BACKGROUND

1. Technical Field

The present disclosure relates to an aqueous adhesive composition, a cloth-transporting belt, an ink jet textile printing apparatus, and a method for preparing an aqueous adhesive composition.

2. Related Art

Ink jet printing methods, which enable high-definition image printing with a relatively simple apparatus, have been rapidly developed in various fields. In such technology, ejection stability and the like are studied from various viewpoints. For example, JP-A-2020-109036 discloses a transporting apparatus and an image printing apparatus that include a member to prevent the transport member from displacing, as a textile printing technique using an ink jet method, to stabilize the contact state between the removal member and the transport member and improves the performance of collecting cleaning water with the removal member.

In textile printing techniques using ink jet methods, cloth is stuck to the transport member (e.g., endless belt) and, in such a state, transported to the printing section. The surface of the transport member is coated with an adhesive (gluing agent) and, therefore, has an adhesion. After being printed, the cloth is removed from the transport member and transported to the next step. For the transport member separated from the cloth, on the other hand, ink, lint, and other residual matter attached to the transport member during printing are desirably removed so as to enable another cloth to be stuck. The residual matter such as ink and lint attached to the transport member during printing is typically cleaned with water. At this time, a cleaning member that cleans the transport member by contacting the transporting member, such as a brush or a sponge, may be used. In general, the adhesion resulting from the adhesive is maintained without requiring an additional adhesive application until a certain number of water cleaning operations.

Regarding adhesives, JP-A-2020-109036 states that "adhesives that can impart an adhesion to transport member 1 include, but are not limited in type, rubber-based adhesives mainly containing natural rubber or synthetic rubber, acrylic-based adhesives, and silicone-based adhesives (translation)". Such adhesives used in ink jet textile printing are generally made of hydrophobic resin dissolved in an organic solvent to maintain the adhesion to some extent even after the adhesive surface is repeatedly cleaned with water. However, aqueous adhesives with a reduced amount of organic solvents are desirable to reduce environmental load ad improve working environment. At the same time, aqueous adhesives are insufficient in terms of cloth transportability (transportability refers to the ability of a belt to transport cloth and allow the cloth to separate easily).

An aqueous adhesive containing acrylic resin and having a certain adhesion is desired which is excellent in terms of cloth transportability, reduces environmental load, and improves the working environment.

SUMMARY

An aqueous adhesive composition of the present disclosure is used to form an adhesive layer on the cloth-transporting belt of an ink jet textile printing apparatus. The aqueous adhesive composition contains acrylic resin and forms an adhesive layer with an adhesion of 0.1 N/25 mm to 10 N/25 mm.

In the present disclosure, a cloth-transporting belt of an ink jet textile printing apparatus includes an adhesive layer originating from the aqueous adhesive composition of the present disclosure at a surface thereof.

An ink jet textile printing apparatus of the present disclosure includes a transport mechanism including a cloth-transporting belt with an adhesive layer made of the aqueous adhesive composition of the present disclosure at a surface thereof. The transport mechanism is configured to transport a cloth stuck to the adhesive layer. The textile printing apparatus also includes a printing section in which the cloth stuck to the adhesive layer is printed using an ink jet head, and a cleaning section that cleans the adhesive layer separated from the cloth after printing.

A method for preparing the aqueous adhesive composition of the present disclosure includes mixing a first solution containing an acrylic resin emulsion and a second solution containing an acrylic resin emulsion and a crosslinking agent. The first solution forms an adhesive layer with a higher adhesion than the second solution.

BRIEF DESCRIPTION OF THE DRAWINGS

FIG. 2 is a table presenting the data of Examples.

DESCRIPTION OF EMBODIMENTS

Figure 1:
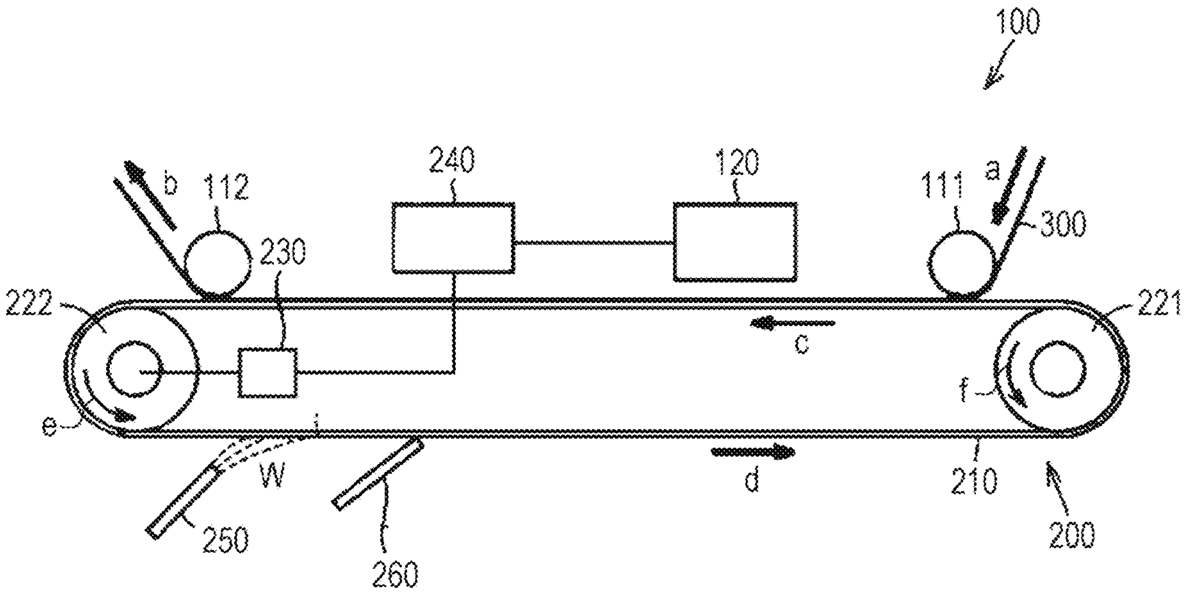
FIG. 1 is a schematic sectional view of an ink jet textile printing apparatus.

Some embodiments of the present disclosure will now be described in detail with reference to the drawings as needed. However, the implementation of the concept of the present disclosure is not limited to the embodiments disclosed herein, and various modifications may be made without departing from the scope and spirit of the disclosure. The same elements in the drawings are designated by the same reference numerals, and thus description thereof is omitted. The vertical, lateral, and other positional relationships are in accordance with the drawing unless otherwise specified. The dimensional proportions in the drawings are not limited to those illustrated in the drawings.

1. Aqueous Adhesive Composition

The aqueous adhesive composition disclosed herein is used to form an adhesive layer on the cloth-transporting belt of an ink jet textile printing apparatus. The aqueous adhesive composition contains acrylic resin and forms an adhesive layer with an adhesion of 0.1 N/25 mm to 10 N/25 mm.

In known ink jet textile printing apparatuses, an adhesive layer is formed on an endless belt or any other transport member, and a cloth to be a printing medium is stuck to the adhesive layer. The cloth is then transported to the printing section, and after being printed, the cloth is separated from the transport member.

Many of the adhesives for such a cloth-transporting member conventionally contain solvent-based acrylic adhesive. However, when solvent-based acrylic adhesives are applied, organic solvents evaporate and may affect the human body in the working environment. For using solvent-based acrylic adhesives, an exhaust system is required to be installed in the environment in which the ink jet textile printing apparatus is used, resulting in a large apparatus as a whole and high cost.

Additionally, in order to apply the adhesive to the cloth-transporting member of an ink jet textile printing apparatus to form an adhesive layer and transport the cloth in close contact with the adhesive layer, the adhesive is required to have an adhesion appropriate to enable the cloth to be stuck and separated and excellent transportability for cloth or sheets.

In view of the above issues, the aqueous adhesive composition disclosed herein, which has the above-described features, has excellent cloth transportability, reduces environmental load, and improves the working environment. The constituents of the aqueous adhesive composition will now be described in detail.

1. 1. Adhesion

The adhesive layer made of the aqueous adhesive composition has an adhesion of 0.1 N/25 mm to 10 N/25 mm. An adhesion of 0.1 N/25 mm or more enables cloth to be favorably transported. When the adhesion is less than 0.1 N/25 mm, the cloth may be partially separated from the belt and become nonuniform and nonflat, resulting in uneven printing. From this point of view, the adhesion may be 0.1 N/25 mm or more, for example, 1.0 N/25 mm or more or 3.0 N/25 mm or more. An adhesion of 10 N/25 mm or less enables the transported cloth to be separated from the belt without stretching or tearing the cloth. From this point of view, the adhesion may be 9.5 N/25 mm or less, for example, 9.0 N/25 mm or less.

180° Peel adhesion is measured as the adhesion in accordance with JIS Z 0237. More specifically, the adhesive is applied onto a 25 mm-wide microscope slide to a thickness of 0.2 mm and dried in an environment of 50% in humidity and 23° C. in temperature for 12 hours to form an adhesive layer sample. The resulting adhesive layer sample and cotton are roller pressed at 0.5 kgf/25 mm, and the 180° peel adhesion is measured. The measurement is conducted at 23° C.

1. 2. Acrylic Resin

Acrylic resin increases the adhesion of the adhesive layer formed on the cloth-transporting member. The acrylic resin may be soluble in water or may be a resin emulsion in which an acrylic resin is dispersed in an aqueous medium. In the present disclosure, these are also collectively referred to as aqueous acrylic resin. The use of aqueous acrylate resin can reduce the environmental load resulting from organic solvents and tends to improve peelability.

The acrylic resin is not limited, provided that it is a polymer obtained by polymerizing one or more acrylic monomers such as (meth)acrylic acid or and (meth)acrylic acid esters as one of the constituents, and examples include polymers obtained from one or more acrylic monomers and copolymers produced from an acrylic monomer and other monomers. Examples of other monomers include, but are not limited to, acrylic monomers such as acrylamide and acrylonitrile, and styrene.

The acrylic resin content may be 80% to 100% by mass, for example, 90% to 99.9% by mass or 95% to 99.6% by mass, relative to the total mass of the aqueous adhesive composition. When the acrylic resin content is 80% by mass or more, the adhesion and water resistance of the adhesive layer tend to be increased. The acrylic resin content may be 100% by mass or less, However, when it is 99.9% by mass or less, the mechanical strength of the adhesive layer tends to be increased.

The acrylic resin may have a plurality of polymer chains, and some of the polymer chains may be crosslinked at their side chains or the like. Such acrylic resins exhibit higher strength. The crosslinking agent is not limited but may be, for example, a compound having a functional group capable of forming ester or amide bonds with the carboxy groups of the acrylic resin. Such a functional group can be a known group, and examples include, but are not limited to, hydroxy, amine, carbodiimide, and epoxy groups.

The acrylic resin may be an individual one or a combination of two or more ones. For example, the acrylic resin may be a mixture of a high-adhesion acrylic resin emulsion and a high-strength acrylic resin emulsion. When such a combination is used, the adhesion of the adhesive layer made of the aqueous adhesive composition can be easily controlled within the above range. The high-adhesion acrylic resin emulsion may be a non-crosslinked acrylic resin emulsion, and the high-strength acrylic resin may be a crosslinked acrylic resin emulsion.

When a non-crosslinked acrylic resin emulsion is used as the high-adhesion acrylic resin emulsion, the amount of the non-crosslinked acrylic resin emulsion in terms of solids may be 20% to 90% by mass, for example, 40% to 80% by mass or 50% to 70% by mass, relative to the total mass of the aqueous adhesive composition. When the amount of the non-crosslinked acrylic resin emulsion in terms of solids is in such a range, the adhesion of the adhesive layer tends to be increased.

When a crosslinked acrylic resin emulsion is used as the high-strength acrylic resin emulsion, the amount of the crosslinked acrylic resin emulsion in terms of solids may be 10% to 80% by mass, for example, 20% to 60% by mass or 30% to 50% by mass, relative to the total mass of the aqueous adhesive composition. When the amount of the crosslinked acrylic resin emulsion in terms of solids is in such a range, the water resistance and mechanical strength of the adhesive layer tends to be enhanced.

Also, the amount of the crosslinked acrylic resin solids in the emulsion may be 10% to 80% by mass, for example, 20% to 60% by mass or 30% to 50% by mass, relative to the total mass of the acrylic resins. When the amount of the crosslinked acrylic resin emulsion in terms of solids is in such a range, the water resistance and mechanical strength of the adhesive layer tends to be enhanced.

1. 3. Surfactant

In some embodiments, the aqueous adhesive composition further contains a surfactant. The surfactant may be, but is not limited to, an anionic surfactant, a nonionic surfactant, or a cationic surfactant.

The anionic surfactant may be, but is not limited to, a compound having any of the hydrophilic groups derived from carboxylic and sulfonic compounds, sulfuric and phosphoric esters, and the like, and any of the hydrophobic groups derived from aliphatic and aromatic compounds and the like.

Examples of the anionic surfactant include alkylsulfocarboxylic acid salts, alkyldiphenyletherdisulfonic acid salts, α-olefinsulfonic acid salts, polyoxyethylene alkyl ether acetic acid salts, N-acylamino acids and their salts, N-acylmethyltaurine salts, alkylsulfuric acid salts such as ammonium lauryl sulfate and sodium lauryl sulfate, alkyl sulfate polyoxyalkyl ether sulfates, alkyl sulfate polyoxyethylene alkyl ether phosphates, rosin acid soap, Castor oil sulfate salts, lauryl alcohol sulfuric ester salts, alkylphenol phosphates, alkyl phosphates, alkylarylsulfonic acid salts, diethylsulfosuccinic acid salts, diethylhexylsulfosuccinic acid salts, and dioctylsulfosuccinic acid salts. Examples of commercially available anionic surfactants include, but are not limited to, Pelex SS-H and Pelex SS-L (both are products of Kao Corporation). Anionic surfactants may be used individually or in combination.

Examples of the nonionic surfactant include acetylene glycol surfactants, silicone surfactants, polyoxyethylene alkyl ethers, polyoxyethylene alkyl phenyl ethers, polyoxyethylene fatty acid esters, polyoxyethylene hydrogenated castor oil, propylene glycol fatty acid esters, glycerol fatty acid esters, polyglycerol fatty acid esters, sorbitan fatty acid esters, sucrose fatty acid esters, alkyl polyglycosides, alkyldiethanolamides, and alkylamine oxides.

Examples of the cationic surfactant include alkylamine salts, fatty acid amidoamine salts, monoalkyl quaternary ammonium salts, dialkyl quaternary ammonium salts, trialkyl quaternary ammonium salts, benzalkonium quaternary ammonium salts, benzethonium chloride, and alkylpyridinium salts.

In some embodiments, anionic surfactants are used, particularly ammonium salts, such as ammonium lauryl sulfate or other ammonium alkyl sulfates. Such surfactants tend to enhance the water resistance of the adhesive layer obtained by coating and drying, reducing the likelihood that water cleaning using a physical way damages the adhesive layer.

The surfactant content may be 0.1% to 10% by mass, for example, 0.5% to 8.0% by mass or 1.0% to 6.0% by mass, relative to the total mass of the aqueous adhesive composition. When the surfactant content is in such a range, the water resistance and mechanical strength of the adhesive layer tend to be enhanced.

1. 4. Water

The water content may be 30% to 80% by mass, for example, 35% to 70% by mass or 40% to 60% by mass, relative to the total mass of the aqueous adhesive composition.

1. 5. Ammonia, Ammonium Ions

In some embodiments of the present disclosure, the aqueous adhesive composition contains ammonia or ammonium ions. Combining the acrylic resin, which contributes to adhesion, with ammonia or ammonium ions tends to improve the stability of the aqueous adhesive composition, improving the water resistance and mechanical strength of the resulting adhesive layer. Since ammonia is volatile, ammonia or ammonium ions evaporate as ammonia with water when the adhesive layer is dried, and ammonium salts are turned into other forms that are difficult to dissolve in water unlike the salts, thus enhancing the water resistance of the adhesive layer. Na or K ions, if used instead of ammonium ions, are nonvolatile metal ions and do not improve water resistance.

In some embodiments of the present disclosure, the aqueous adhesive composition further contains a pH adjuster, and the pH adjuster contains ammonia. The ammonia may function as an emulsion stabilizer. Also, an anionic surfactant, particularly an ammonium alkyl sulfate-based surfactant, may function as an emulsifying dispersant in the aqueous adhesive composition. Such constituents tend to enhance the water resistance of the adhesive layer obtained by coating and drying even though aqueous acrylic resin is used and further reduce the likelihood that water cleaning using a physical way damages the adhesive layer.

The ammonia content may be 0.1% to 5.0% by mass, for example, 0.3% to 2.0% by mass or 0.5% to 3.0% by mass, relative to the total mass of the aqueous adhesive composition. Such an amount of ammonia tends to further improve water resistance. The ammonia content of the aqueous adhesive composition may include ammonium ions.

In some embodiments of the present disclosure, the aqueous adhesive composition contains a larger amount of ammonium ions than the total amount of sodium and potassium ions. Such an aqueous adhesive composition tends to enhance water resistance.

In some embodiments of the present disclosure, the ratio of the total amount of sodium and potassium ions to the amount of ammonium ions, (ammonium ions)/(sodium and potassium ions), is 100 or more. Such an aqueous adhesive composition tends to enhance water resistance. In this point of view, the (ammonium ions)/(sodium and potassium ions) ratio may be 140 or more, for example, 180 or more or 200 or more. Also, the (ammonium ions)/(sodium and potassium ions) ratio may be 350 or less, for example, 300 or less.

1. 6. Organic Solvent

In some embodiments of the present disclosure, the aqueous adhesive composition is free from organic solvents from the viewpoint of reducing environmental load and human health impact. The amount of organic solvents, if contained, may be 5.0% by mass or less, for example, 2.5% by mass or less or 1.0% by mass or less, relative to the total mass of the aqueous adhesive composition. Such a composition tends to reduce environmental load. Accordingly, the aqueous adhesive composition tends to reduce volatile organic compounds (VOC) when the composition is used, thus improving the working environment.

The organic solvents mentioned herein do not include the above-described amine compounds or surfactants.

1. 7. Coloring Material

In some embodiments, the aqueous adhesive composition contains no coloring material. The amount of coloring material, if contained, may be 1.0% by mass or less, for example, 0.5% by mass or less or 0.3% by mass or less, relative to the total mass of the aqueous adhesive composition. Hence, the aqueous adhesive composition disclosed herein is clearly distinguished from the compositions intended for coloring, such as ink compositions, painting paste, and paints.

The aqueous adhesive composition disclosed herein forms an adhesive layer on the cloth-transporting belt of an ink jet textile printing apparatus.

The material of the cloth-transporting belt is not limited. The cloth-transporting belt may contain urethane resin, polyester, or the like and, in some embodiments, contains urethane resin. The cloth-transporting belt with a urethane resin surface tends to have higher transportability.

The cloth-transporting belt may be fibrous and, in some embodiments, contains polyphenylene ether-based fiber or aramid fiber. In this instance, the mechanical strength of the cloth-transporting belt tends to be enhanced.

The adhesive layer may have a pencil hardness of HB or more, for example, 2H or more or 4H or more. Such an adhesive layer exhibits an excellent hardness. The Mohs hardness of the adhesive layer may be 2 or more. Such an adhesive layer exhibits an excellent hardness. The pencil hardness and Mohs hardness of the adhesive layer can be controlled by adjusting the amount of high-strength acrylic resin emulsion (crosslinked acrylic resin emulsion) to be used.

2. Preparation of Aqueous Adhesive Composition

The method for preparing the aqueous adhesive composition disclosed herein includes mixing a first solution containing an acrylic resin emulsion and a second solution containing an acrylic resin emulsion and a crosslinking agent, and the first solution forms an adhesive layer with a higher adhesion than the second solution.

The first solution containing an acrylic resin emulsion can form adhesive layers with higher adhesion than the second solution containing an acrylic resin emulsion and a crosslinking agent. The second solution containing an acrylic resin emulsion and a crosslinking agent can form adhesive layers with higher strength than the first solution containing an acrylic resin emulsion. Mixing the first solution containing an acrylic resin emulsion and the second solution containing an acrylic resin emulsion and a crosslinking agent enables the aqueous adhesive composition to impart excellent cloth transportability to the resulting adhesive layer.

The acrylic resin emulsion may be a commercial product, for example, BPW 6441 (produced by Toyochem Co., Ltd.)

The crosslinking agent may be, but is not limited to, CARBODILITE E-02 (produced by Nisshinbo Chemical Inc.)

In some embodiments, the second solution contains ammonia. The second solution containing acrylic resin, which contributes to adhesion, and ammonia tends to improve the stability of the aqueous adhesive composition, improving the water resistance and mechanical strength of the resulting adhesive layer.

3. Ink Jet Textile Printing Apparatus

The ink jet textile printing apparatus disclosed herein includes a transport mechanism that includes a cloth-transporting belt with an adhesive layer made of the aqueous adhesive composition of an embodiment at the surface and that is configured to transport a cloth stuck to the adhesive layer, a printing section in which the cloth stuck to the adhesive layer is printed using an ink jet head, and a cleaning section that cleans the adhesive layer from which the printed cloth is removed.

The transport mechanism includes a cloth-transporting belt with an adhesive layer made of the aqueous adhesive composition disclosed herein at the surface and transports a cloth stuck to the adhesive layer. For forming the adhesive layer of the aqueous adhesive composition, the aqueous adhesive composition may be applied onto a surface of a cloth-transporting member of an ink jet textile printing apparatus.

In the formation of the adhesive layer, the aqueous adhesive composition is applied onto a surface of a cloth-transporting member, thus forming the adhesive layer. For applying the aqueous adhesive composition to the cloth-transporting member, the adhesive composition may be applied, but not limited to, over the entire surface of the cloth-transporting member with a blade or the like or in a pattern on a part of the surface of the cloth-transporting member.

In the formation of the adhesive layer, the aqueous adhesive composition may be dried to form the adhesive layer. The drying temperature may be 10° C. to 60° C., for example, 20° C. to 40° C. The drying time may be 1 to 24 hours, for example, 2 to 8 hours. Such drying conditions tend to enhance the water resistance and mechanical strength of the resulting adhesive layer.

An ink jet textile printing apparatus 100 according to an embodiment of the present disclosure will now be described with reference to FIG. 1. FIG. 1 depicts the overall configuration of an ink jet textile printing apparatus 100 including a transport unit 200. In FIG. 1, arrows a and b indicate the direction in which a printing medium 300 is transported. Arrows c and d indicate the direction in which a cloth-transporting member 210 rotates. Arrows e and f indicate the directions in which transport rollers 222 and 221 rotate, respectively.

The ink jet textile printing apparatus 100 may include a transport unit 200 that transports the printing medium stuck to the surface, printing medium-transporting rollers 111 and 112, and a printing section 120. A printing medium 300 transported in direction a is pressed on the cloth-transporting member 210 by the printing medium-transporting roller 111 to be stuck to the surface of the cloth-transporting member 210.

The transport unit 200 transports the printing medium 300 stuck to the surface of the cloth-transporting member 210 to the position under the printing section 120, and the printing section 120 prints the printing medium 300. Then, the printing medium 300 is separated from the cloth-transporting member 210 at the printing medium-transporting roller 112.

The printing section 120 may eject ink compositions by an ink jet method. In the present embodiment, the printing section 120 is designed to use an ink jet head to print textile fabrics as the printing medium 300, whereas, in other embodiments, the printing section is not limited to such a structure.

The transport unit 200 may include a pair of transport rollers 221 and 222, the cloth-transporting member 210, a driving motor 230, a controller 240, a cleaning section 250, and a removal member 260.

The transport rollers 221 and 222 drive the cloth-transporting member 210 in a fixed direction. The cloth-transporting member 210 may be a belt member with an adhesive layer at the surface and is circularly spanned between the transport rollers 221 and 222. The cloth-transporting member 210 is allowed to transport the printing medium in direction c by the rotation of the transport rollers 221 and 222 by the driving motor 230. The controller 240 may control either the transport unit 200 or the ink jet textile printing apparatus 100 or both.

The cleaning section 250 cleans the surface of the cloth-transporting member 210 from which the printing medium 300 is removed. The cleaning section 250 removes the remaining components of the printing medium 300 and printing color agent attached to the cloth-transporting member 210 during printing. The cleaning section 250 may include a pump (not shown), a spray outlet, and a spray pipe.

The removal member 260 removes the water attached by the cleaning section 250 to the cloth-transporting member 210. The removal member 260 may be, but is not limited to, a blade. The blade may be made of an elastic material. From the viewpoint of wear resistance, the blade may be made of polyurethane. The contact portion of the blade with the cloth-transporting member 210 may be rectangular in section but may have a shape with the tip cut off at an angle.

In some embodiments, the cloth-transporting member 210 is made of an elastic material. A heater (not shown) may be provided to warm the cloth-transporting member 210. The cleaning of the cloth-transporting member 210 may be performed using a water receiver (not shown) that receives cleaning water and a brush (not shown), a sponge (not shown) or any other member that clean the cloth-transporting member 210.

The printing medium 300 may be a cloth of natural or synthetic fiber, such as silk, cotton, sheep wool, nylon, polyester, or rayon.

4. Cloth-Transporting Belt of Ink Jet Textile Printing Apparatus

The cloth-transporting belt of the ink jet textile printing apparatus disclosed herein includes an adhesive layer originating from the aqueous adhesive composition disclosed herein at the surface. The cloth-transporting belt may be made of, but not limited to, an elastic material, particularly urethane material. Using the aqueous adhesive composition for such a cloth-transporting belt enhances the close contact of the adhesive layer with the cloth-transporting belt, accordingly enhancing durability.

5. Ink Jet Textile Printing Method

An ink jet textile printing method includes transporting a cloth stuck to the adhesive layer formed of the aqueous adhesive composition at the surface of the cloth-transporting member (e.g., cloth-transporting belt) of an ink jet textile printing apparatus, printing the cloth stuck to the adhesive layer with an ink jet head, and a cleaning the adhesive layer from which the printed cloth is removed.

5. 1. Transporting

In the operation of transporting a cloth, a cloth stuck to the adhesive layer made of the aqueous adhesive composition at the surface of the cloth-transporting member of the ink jet textile printing apparatus is transported. The cloth may be stuck by, but not limited to, being pressed on the adhesive layer with a medium-transporting roller, as illustrated in FIG. 1.

5. 2. Printing

In the operation of printing, the cloth stuck to the adhesive layer is printed using an ink jet head. In this operation, the cloth-transporting member transports the cloth in close contact with the cloth-transporting member with the adhesive layer in between, and ink is ejected onto the cloth from the printing section 120 during the transport of the cloth. Then, the cloth with the ink attached may be removed from the adhesive layer and collected.

5. 3. Cleaning

In the operation of cleaning, the adhesive layer from which the printed cloth is removed is cleaned. Lint and other foreign particles originating from the cloth attached during printing is removed by cleaning.

EXAMPLES

The present disclosure will be further described in detail with reference to Examples and Comparative Examples. However, the implementation of the concept of the present disclosure is not limited to the following Examples.

1. Preparation of Aqueous Adhesive Compositions

FIG. 2 presents a table showing the makeup of aqueous adhesive compositions. Constituents of each composition presented in the table were placed into a mixing tank and then mixed and stirred to afford the aqueous adhesive composition of the corresponding Example. In the table, each constitution content is in terms of solids and expressed as mass %. The ammonia content of ammonia water was 28% by mass. The other constituents are 100% by mass on their own, not containing solvents or the like.

The numerical values in the table are expressed as % by mass (mass %) unless otherwise noted. The constituents presented in the table are as follows:

Crosslinking Agent

- CARBODILITE (registered trademark) E-02 (produced by Nisshinbo Chemical Inc.)

Acrylic Resin

- High-adhesion aqueous acrylic resin emulsion
  - A-1: BPW 6441 (trade name, 50% by mass in non-volatile content), produced by Toyochem Co., Ltd.
- High-strength aqueous acrylic resin emulsion
  - A-2: Solution obtained by mixing 50 parts by mass of BPW 6441 (produced by Toyochem Co., Ltd.) and 1 part by mass of CARBODILITE E-02 produced by (Nisshinbo Chemical Inc.) and crosslinking them at 70° C. for 5 hours
  - A-3: Solution obtained by mixing 50 parts by mass of BPW 6441, 1 part by mass of CARBODILITE E-02, and 1 part by mass of 28% ammonia water and subjecting the mixture to a crosslinking reaction at 70° C. for 5 hours
  - A-4: Solution obtained by mixing 50 parts by mass of BPW 6441, 1 part by mass of CARBODILITE E-02, and 0.2 part by mass of 1% NaOH aqueous solution and subjecting the mixture to a crosslinking reaction at 70° C. for 5 hours.

Surfactant

- Ammonium lauryl sulfate

Alkali

- Ammonia water (containing ammonium ions)

The ammonium ion concentration and the total concentration of sodium ions and potassium ions in the aqueous adhesive compositions prepared above were measured with an ammonium ion meter TiN-9001, a sodium ion meter TiN-1100, and a potassium ion meter TiN-7003, all manufactured by K.K. Toko Kagaku Kenkyusho.

2. Evaluation 2. 1. Adhesion

180° Peel adhesion was measured in accordance with JIS Z 0237. More specifically, the adhesive was applied onto a 25 mm-wide microscope slide to a thickness of 0.2 mm and dried in an environment of 50% in humidity and 23° C. in temperature for 12 hours to form an adhesive layer sample. The resulting adhesive layer sample and cotton are roller pressed at 0.5 kgf/25 mm, and the 180° peel adhesion was measured. The measurement was conducted at 23° C.

2. 2. Pencil Hardness

The pencil hardness of the adhesive layer samples formed as described above was measured by a scratch hardness test (pencil test at a weight of 500 g) specified in JIS K5600-5-4. In the case in which the adhesive has so high an adhesion that the tester could not be pushed, scratches were measured when the tester was pulled.

2. 3. Mohs Hardness

The Mohs hardness of the adhesive layer samples formed as described above was measured by rubbing the sample with a Mohs scale rock with a Mohs hardness of 1, and the Mohs hardness of samples scratched by the rock was determined 1, and that of samples not scratched was determined 2.

2. 4. Water Resistance

The adhesive layer samples formed as described above were immersed in pure water of 23° C. for 20 minutes, and the degree to which the sample was whitened was visually evaluated. The more whitened the sample was, the less resistant it was to water, and the water resistance was thus rated based on the degree of whiteness according to the following criteria.

Criteria:

A: Transparent

B: Slightly whitened

C: Extremely whitened 2. 5. Transportability

Adhesive layer samples were formed by evenly applying an aqueous adhesive composition of the Examples or Comparative Examples onto the entire surface of the cloth-transporting belt of a digital textile printing machine, EPSON Monna Lisa 8000, with a blade and drying the composition. Two types of cloth-transporting belts were used: one with a urethane surface and the other with a polyester surface. A cloth was stuck to the adhesive layer at the surface of the cloth-transporting belt and transported 10 m, 1000 m, and 10000 m by the transport mechanism of the ink jet textile printing machine. The transportability was rated according to the following criteria.

Criteria:

A: Cotton cloth and polyester sheet were transported.

B: While cotton cloth was transported, polyester sheet was not.

C: Cotton cloth and polyester sheet were transported, but the adhesive was attached to the cloth.

D: Cotton cloth and polyester sheet were both not transported.

E: Cotton cloth and polyester sheet were stretched when pulled to be removed from the belt.

As is clear from the results presented in Table 1, the samples according to the present disclosure produced satisfactory results. On the other hand, the Comparative Examples did not provide satisfactory results.

What is claimed is:

1. An ink jet textile printing apparatus, comprising:

a transport mechanism including a cloth-transporting belt with an adhesive layer at a surface thereof, the transport mechanism being configured to transport a cloth stuck to the adhesive layer;

a printing section in which the cloth stuck to the adhesive layer is printed using an ink jet head; and a cleaning section that cleans the adhesive layer from which the cloth is removed after printing, wherein the adhesive layer is formed of an aqueous adhesive composition including an acrylic resin, and wherein the adhesive layer formed of the aqueous adhesive composition has an adhesion of 0.1 N/25 mm to 10 N/25 mm.

2. The ink jet printing apparatus according to claim 1, wherein the composition contains a larger amount of ammonium ions than the total amount of sodium and potassium ions.

3. The ink jet printing apparatus according to claim 1, wherein the composition contains ammonium ions in an (ammonium ions)/(sodium and potassium ions) ratio of 100 or more, wherein the (ammonium ions)/(sodium and potassium ions) ratio is the ratio of the amount of ammonium ions to the amount of sodium and potassium ion.

4. The ink jet printing apparatus according to claim 1, wherein the cloth-transporting belt contains urethane resin.

5. The ink jet printing apparatus according to claim 1, wherein the adhesive layer has a pencil hardness of HB or more.

6. The ink jet printing apparatus according to claim 1, wherein the adhesive layer has a Mohs hardness of 2 or more.

7. The ink jet printing apparatus according to claim 1, further comprising a surfactant containing ammonium alkyl sulfate.

8. The ink jet printing apparatus according to claim 1, further comprising a pH adjuster containing ammonia.

9. The ink jet printing apparatus according to claim 1, wherein the cloth-transporting belt contains polyphenylene ether-based fiber or aramid fiber.

10. A cloth-transporting belt of the ink jet textile printing apparatus according to claim 1, the cloth-transporting belt comprising:

the adhesive layer at a surface thereof.

11. A method for preparing the aqueous adhesive composition as set forth in claim 1, the method comprising:

mixing a first solution containing an acrylic resin emulsion and a second solution containing an acrylic resin emulsion and a crosslinking agent, wherein the first solution, when used alone, is configured to form an adhesive layer with a higher adhesion than an adhesive layer formed only using the second solution.

12. The method according to claim 11, wherein the second solution contains ammonia.

* * * * *